United States Patent [19]
Digalakis et al.

[11] Patent Number: 5,864,810
[45] Date of Patent: *Jan. 26, 1999

[54] METHOD AND APPARATUS FOR SPEECH RECOGNITION ADAPTED TO AN INDIVIDUAL SPEAKER

[75] Inventors: Vassilios Digalakis, Crete, Greece; Leonardo Neumeyer, Menlo Park; Dimitry Rtischev, Fremont, both of Calif.

[73] Assignee: SRI International, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 375,908

[22] Filed: Jan. 20, 1995

[51] Int. Cl.$^6$ ...................................................... G10L 5/06
[52] U.S. Cl. ........................... 704/255; 704/254; 704/256
[58] Field of Search ................................ 381/41, 42, 43; 395/2.49, 2.54, 2.46, 2.59, 2.64, 2.65, 2.66

[56] References Cited

U.S. PATENT DOCUMENTS

| | | | |
|---|---|---|---|
| 4,817,156 | 3/1989 | Bahl et al. | 381/43 |
| 4,829,577 | 5/1989 | Kuroda et al. | 381/43 |
| 4,876,720 | 10/1989 | Kaneko et al. | 381/43 |
| 4,977,598 | 12/1990 | Doddington et al. | 381/43 |
| 5,046,099 | 9/1991 | Nishimura | 381/43 |
| 5,050,215 | 9/1991 | Nishimura | 381/43 |
| 5,075,896 | 12/1991 | Wilcox et al. | 381/41 |
| 5,199,077 | 3/1993 | Wilcox et al. | 381/43 |
| 5,450,523 | 9/1995 | Zhao | 395/2.52 |

OTHER PUBLICATIONS

Lee, C.H. et al "A Study on Speaker Adaptation of the Parameters of Continuous Density Hidden Markov Models", IEEE Transactions on Signal Processing, vol. 39, #4, Apr. 1991.

Lee, K.F. et al "Allophone Clustering for Continuous Speech Recognition", ICASSP '90, Acoustics, Speech and Signal Processing Conference, Feb. 1990.

Digalakis et al, "Speaker Adaptation Using Combined Transformation and Bayesian Methods", ICASSP, pp. 680–683, vol. 1, May 1995.

Rtischev et al, "Speaker Adaptation via VQ Prototype Modification", IEEE Transaction on Speech and Audio Processing, vol. 2, #1, Jan. 1994.

Kosaka et al, "Rapid Speaker Adaptation using Speaker–Mixture Allophone Models Applied to Speaker–Independent Speech Recognition", Apr. 1993.

Hwang et al, "Subphonetic Modeling withg Markov States –Senone", ICASSP 1992, pp. 33–36, vol. 1, Sep. 1992.

Lee, K.F., "Context–Dependent Phonetic Hidden Markov Models for Speaker–Independent Continuous Speech Recognition", IEEE Transactions on Acoustics, Speech, and Signal Processing, vol. 38, #4, Apr. 1990.

Huang et al, On Speaker–Independent, Speaker Dependent, and Speaker–Adaptive Speech Recognition, IEEE Transactions on Speech and Audio Processing, vol. 1, #2, Apr. 1993.

L. R. Bahl, F. Jelinek and R. L. Mercer, "A Maximum Likelihood Approach to Continuous Speech Recognition," IEEE Trans. Pattern Analysis and Machine Intelligence, vol. PAMI–5(2), pp. 179–190, Mar. 1983.

J. Bellegarda, "Robust Speaker Adaptation Using a Piecewise Linear Acoustic Mapping," Proceedings ICASSP, pp. I–445–I–448, San Francisco, CA, 1992.

(List continued on next page.)

*Primary Examiner*—David R. Hudspeth
*Assistant Examiner*—Michael N. Opsasnick
*Attorney, Agent, or Firm*—Townsend and Townsend and Crew LLP

[57] ABSTRACT

A method and apparatus for automatic recognition of speech adapts to a particular speaker by using adaptation data to develop a transformation through which speaker independent models are transformed into speaker adapted models. The speaker adapted models are then used for speaker recognition and achieve better recognition accuracy than non-adapted models. In a further embodiment, the transformation-based adaptation technique is combined with a known Bayesian adaptation technique.

30 Claims, 6 Drawing Sheets

OTHER PUBLICATIONS

P. Brown, C.-H. Lee and J. Spohrer, "Bayesian Adaptation in Speech Recognition," Proceedings ICASSP, pp. 761–764, Boston, MA, 1983.

K. Choukri, G. Chollet and Y. Grenier, Spectral Transformations through Canonical Correlation Analysis for Speaker Adaptation in ASR, "Proceedings ICASSP," pp. 2659–2662, Tokyo, Japan, 1986.

S. Furui, "Unsupervised Speaker Adaptation Method Based on Hierarchical Speaker Clustering," Proceedings ICASSP, pp. 286–289, Glasgow, Scotland, 1989.

X. Huang and K.-F. Lee, "On Speaker–Independent, Speaker–Dependent and Speaker–Adaptive Speech Recognition," IEEE Trans. on Speech and Audio Processing, vol. 1, No. 2, pp. 150–157, Apr. 1993.

B.-H. Juang, "Maximum–Likelihood Estimation for Mixture Multivariate Stochastic Observations of Markov Chains," AT/&T Technical Journal, vol. 64, No. 6, Jul.–Aug. 1985.

C.-H. Lee, C.-H. Lin and B.-H. Juang, "A Study on Speaker Adaptation of the Parameters of Continuous Density Hidden Markov Models," IEEE Trans. on Acoust., Speech and Signal Proc., vol. ASSP–39 (4), pp. 806–814, Apr. 1991.

R. Schwartz, Y. L. Chow and F. Kubala, "Rapid Speaker Adaptation Using a Probabilistic Spectral Mapping," Proceedings ICASSP, pp. 633–636, Dallas, TX, 1987.

| Speaker | | | 4n0 | 4n3 | 4n5 | 4n9 | 4n0 | AVG/SUM |
|---|---|---|---|---|---|---|---|---|
| Num. sentences | | | 41 | 42 | 41 | 42 | 40 | 206 |
| Num. words | | | 719 | 696 | 664 | 668 | 678 | 3425 |
| Type | Num. genomes | Num. trnsf. | | | | | | |
| SI | 40 | – | 50.3 | 43.1 | 23.6 | 17.7 | 12.5 | 29.8 |
| SA | 40 | 40 | 24.1 | 18.2 | 17.9 | 12.4 | 9.1 | 16.5 |
| SI | 200 | – | 49.4 | 43.8 | 24.2 | 17.1 | 14.2 | 30.1 |
| SA | 200 | 200 | 21.4 | 18.7 | 18.4 | 12.0 | 10.5 | 16.2 |
| SI | 500 | – | 49.9 | 40.5 | 22.3 | 14.7 | 14.2 | 28.7 |
| SA | 500 | 200 | 20.2 | 15.8 | 16.6 | 12.3 | 10.5 | 15.1 |
| SA | 500 | 500 | 20.0 | 18.7 | 17.8 | 15.1 | 11.2 | 16.6 |
| SI | 950 | – | 50.5 | 44.7 | 20.5 | 15.3 | 14.4 | 29.5 |
| SA | 950 | 200 | 21.2 | 19.0 | 16.1 | 12.0 | 10.3 | 15.8 |
| SA | 950 | 950 | 24.2 | 21.7 | 18.8 | 13.5 | 9.7 | 17.7 |

| Test Set | Speaker Independent Models | | Speaker Adapted Models | |
|---|---|---|---|---|
| | Bigram | Trigram | Bigram | Trigram |
| WSJ1 Development | 29.3 | 23.5 | 14.7 | 11.5 |
| November 93 Evaluation | 21.0 | 16.5 | 13.6 | 11.0 |

METHOD AND APPARATUS FOR SPEECH RECOGNITION ADAPTED TO AN INDIVIDUAL SPEAKER

This invention was supported in part by grants from the Office of Naval Research, Contracts N00014-93-C-0142 and N00014-92-C-0154, and in part by SRI International of Menlo Park, Calif. The Government has certain rights in this material.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to automatic speech recognition and, more particularly, to a method and system for adapting the models used in a speech recognition system to a particular speaker.

This art presumes a basic familiarity with statistics and Markov processes, as well as familiarity with the state of the art in speech recognition systems using Hidden Markov Models. The state of the art was discussed at length in related U.S. patent application Ser. No. 08/276,742 filed Jul. 18, 1994 and that discussion is incorporated herein by reference including the discussion of all prior art references cited.

By way of example of the state of the art in the particular field of adapting speech recognition systems to particular speakers, reference is made to the following patents and publications, which have come to the attention of the inventors in connection with the present invention. Not all of these references may be deemed to be relevant prior art.

| Inventor | U.S. Pat. No. | Issue Date |
| --- | --- | --- |
| Bahl et al. | 4,817,156 | 03/28/89 |
| Kuroda et al. | 4,829,577 | 05/09/89 |

Papers

L. R. Bahl, F. Jelinek and R. L. Mercer, "A Maximum Likelihood Approach to Continuous Speech Recognition," IEEE Trans. Pattern Analysis and Machine Intelligence, Vol. PAMI-5(2), pp. 179–190, March 1983.

J. Bellegarda, "Robust Speaker Adaptation Using a Piecewise Linear Acoustic Mapping," Proceedings ICASSP, pp. I-445–I-448, San Francisco, Calif., 1992.

P. Brown, C.-H. Lee and J. Spohrer, "Bayesian Adaptation in Speech Recognition," Proceedings ICASSP, pp. 761–764, Boston, Mass., 1983.

K. Choukri, G. Chollet and Y. Grenier, "Spectral Transformations through Canonical Correlation Analysis for Speaker Adaptation in ASR, "Proceedings ICASSP," pp. 2659–2662, Tokyo, Japan, 1986.

S. Furui, "Unsupervised Speaker Adaptation Method Based on Hierarchical Speaker Clustering," Proceedings ICASSP, pp. 286–289, Glasgow, Scotland, 1989.

X. Huang and K.-F. Lee, "On Speaker-Independent, Speaker-Dependent and Speaker-Adaptive Speech Recognition," IEEE Trans. on Speech and Audio Processing, Vol. 1, No. 2, pp. 150–157, April 1993.

B.-H. Juang, "Maximum-Likelihood Estimation for Mixture Multivariate Stochastic Observations of Markov Chains," AT\&T Technical Journal, Vol. 64, No. 6, July–August 1985.

C.-H. Lee, C.-H. Lin and B.-H. Juang, "A Study on Speaker Adaptation of the Parameters of Continuous Density Hidden Markov Models," IEEE Trans. on Acoust., Speech and Signal Proc., Vol. ASSP-39(4), pp. 806–814, April 1991.

R. Schwartz, Y. L. Chow and F. Kubala, "Rapid Speaker Adaptation Using a Probabilistic Spectral Mapping," Proceedings ICASSP, pp. 633–636, Dallas, Tex., 1987.

A recent trend in automatic speech recognition systems is the use of continuous-mixture-density Hidden Markov Models (HMMs). A system and method for using HMMs to recognize speech is disclosed in related U.S. patent application Ser. No. 08/276,742 assigned to the assignee of this application. Despite the good recognition performance that HMM systems achieve on average in large vocabulary applications, there is a large variability in performance across individual speakers. Performance can degrade rapidly when the user is radically different from the training population, such as a user who speaks with a heavy accent. One technique that can improve the performance and robustness of a speech recognition system is to adapt the system to the speaker, and, more generally, to the channel and the task.

Two families of adaptation schemes have been proposed in the prior art. One is based on transforming an individual speaker's feature space so that it "matches" the feature space of the training population. This technique may be generally referred to as the Feature-Space Transformation-based approach (FST). This technique has the advantage of simplicity, and if the number of free parameters in the transformations is small, then this technique has the desirable characteristic of quick adaptation.

The second main family of adaptation methods follows a Bayesian approach of progressively transforming the HMMs so that the models best predict adaptation data from the individual speaker. In a Bayesian approach, model parameters are re-estimated using some prior knowledge of model parameter values. The Bayesian approach usually has desirable asymptotic properties, that is, the performance of the speaker-adaptive system will converge to the performance of a speaker-dependent trained system as the amount of adaptation speech increases. This method has the disadvantage that the adaptation rate is usually slow.

What is needed is a speaker adaptive method and system that has superior performance for individual speakers, including those who speak with very different accents from the training population, but that can adapt quickly to a particular speaker using a small amount of adaptation data.

SUMMARY OF THE INVENTION

According to the present invention, a speech recognition system adapts itself to a particular speaker by applying a constrained maximum likelihood transformation (CML) to its stored speech recognition models. This CML approach represents a third main family of adaptation method. The constrained linear transformation is derived from a relatively small amount of speaker dependent (SD) training data. Applying the transformation to the speaker independent (SI) models stored in the recognition system produces a set of speaker adapted (SA) models. When these SA models are used by the recognition system according to the present invention, greatly improved recognition performance of an individual speaker is achieved. The recognition performance improvement over a non-adaptive system is even greater when the speaker speaks very differently from the training population, such as a speaker with a heavy accent.

According to a further embodiment, a speech recognition system uses the CML approach in combination with a Bayesian approach to achieve superior performance. FIGS. 1A, 1B, 1C are a representation of the known Bayesian Approach, the CML Approach of the present invention, and the Combination Approach.

FIG. 1A depicts the CML approach according to the invention. Adaptation data 12 is used to derive a transformation 22. This transformation 22 is then used to transform the parameters of the SI Models 10 to derive SA Models 20.

FIG. 1B depicts the known Bayesian approach for adapting a speech recognition to a particular speaker. The system starts initially having some "prior knowledge" about model parameters, represented as the SI Models 10. Adaptation data 12 from a particular speaker is then processed by a Baum-Welch algorithm 14 to produce SD Models 16. According to the Bayesian approach, these SD Models are then combined with SI models by adder to produce a set of SA recognition models 20. According to the Bayesian approach, the SA models 20 can then be substituted in the method for the prior knowledge SI models 10 and the process can be repeated to better improve the SA models.

FIG. 1C depicts the Combination approach according to the invention. SA Models 20 are derived as in the CML approach and are then used as "prior knowledge" in a Bayesian type approach to produce SA" Models 22 by combining the SA models with SD models 16.

One particular type of speech recognition system in which the present invention may be effectively employed uses multi-dimensional Gaussian mixture densities to model the probability functions of various speech states that are stored in the recognition models. The Gaussian mixture densities are derived from the SI training data when the models are trained and are stored in the recognition system as a weighted sum of simple Gaussian curves. The SI training data typically consist of speech samples from a number of different speakers (the "training population") each speaking a transcribed speech sample.

The Gaussian mixture density of a particular state in such a system is generally stored as a weighted sum of simple Gaussian curves. The set of simple Gaussian curves used to model a particular state is referred to in the art as a "codebook." In a fully-tied speech recognition system, one codebook of simple Gaussian curves is used to model the probability density functions of all of the speech states in the system and each probability density function has associated with it only a set of weighting coefficients that are applied to the Gaussians in the shared codebook. In a fully-untied system, a separate codebook of simple Gaussian curves is used to model the probability density function of each separate speech state in the system.

Related patent application Ser. No. 08/276,742 disclosed a type of a partially-tied system, in which there are multiple codebooks, and a single codebook of simple Gaussian curves is used to model the probability density function of a group or "cluster" of related speech states. According to one specific embodiment, the invention achieves rapid and efficient adaptation in such a recognition system by assuming that the same transformation can be effectively used for all of the Gaussians in a particular codebook. Therefore, with even a small amount of SD data, a transformation can be computed for all of the stored Gaussians. According to a further embodiment of the invention, a linear transformation may be shared by different related codebooks.

The invention, according to one embodiment, uses a CML approach to estimate parameters for transforming the speech recognition models, rather than transforming the speech data directly. This technique allows the invention to use the well-known Expectation-Maximization (EM) algorithm to determine Maximum Likelihood (ML) estimates of these parameters. The advantage of using the EM algorithm is that the invention can estimate the transformation from new-speaker SD data alone without the need present in some prior art systems for some form of time alignment between the new-speaker data and the training data. Furthermore, in contrast to previous adaptation schemes based on feature transformations, the present invention has the advantage that it does not require the new speaker to record sentences with previously specified transcriptions.

The invention was evaluated on the large-vocabulary Wall Street Journal corpus, for both native and non-native speakers of American English. For native speakers, the recognition performance after adaptation is similar to that of speaker-dependent systems that use 6 times as much training data. For non-native speakers, the recognition error rate is approximately halved, approaching that of native speakers, with only a small amount of adaptation data.

DESCRIPTION OF PREFERRED EMBODIMENTS

For purposes of clarity, the method and system of the invention will be described with reference to a particular embodiment of the invention as incorporated in a speech recognition system using HMMs with Gaussian mixtures and having an arbitrary degree of mixture-tying as disclosed in previously referenced patent application Ser. No. 08/276, 742. However, it will be obvious to one of skill in the art that the method of the invention may be employed in a wider range of recognition systems, particularly any system using continuous mixture density HMMs.

A common technique for matching an input speech signal to stored phones uses Hidden Markov Models (HMMs). One HMM speech recognition system constructs, for each phone, a three-state directed HMM. Training the HMM consists of extracting features from a collection of speech samples from various speakers speaking known phrases of speech and using the extracted features to determine optimal HMM parameters. The process of extracting features divides a speech signal into a number of temporal windows, generally of equal duration, referred to in the art as frames. Once the parameters for each HMM have been determined, the trained HMMs, with their parameters, are stored in the speech recognition system. The recognition system is then ready to process an unknown speech signal and determine the most likely words spoken by comparing features extracted from that speech with the probability functions for speech states stored in the HMMs.

Figure 2:
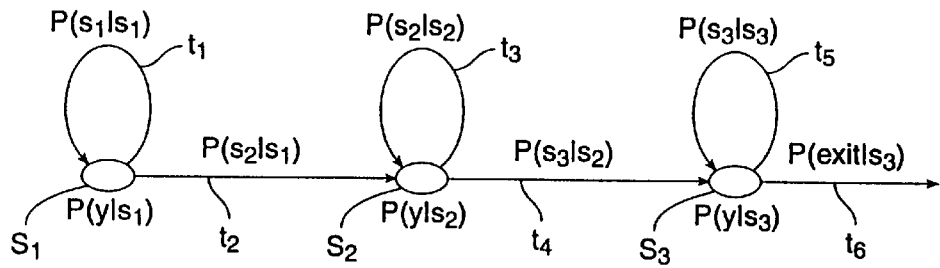
FIG. 2 is a diagram of an HMM for a single phone.

FIG. 2 depicts one type of three-state HMM for a single phone, such as the phone "ao" representing the first vowel sound in the word "water." The three states, $s_1$, $S_2$, and $S_3$, are associated with a collection of features that might be detected during a given frame. Associated with each transition between states is a probability of taking that transition between frames. This probability is not set at the time the model is selected, but it is determined in the training step using actual speech data. The transition probability distributions implicitly model varying durations possible in different parts of speech due to different speech rates or different pronunciations.

Associated with each of the three possible HMM states are probability functions $P(y|s_1)$, $P(y|s_2)$, and $P(y|s_3)$ that give the probability that an observed feature set y was generated by a speech signal in that respective state. As an example, the function $P(y|s_1)$ provides the probability of observing y at state $s_1$ rather that a different feature set y'. The HMM further includes six transitions t1–6, with associated probability functions $P(s_1|s_1)$, $P(s_2|s_2)$, $P(s_2|s_2)$, $P(s_3|s_3)$, $P(s_3|s_3)$, $P(s_{exit}|s_3)$. According to the model, a transition occurs at every frame boundary and the aforementioned transition probability functions determine the probability that a particular transition will be taken given that the system is in the particular state.

Figure 3:
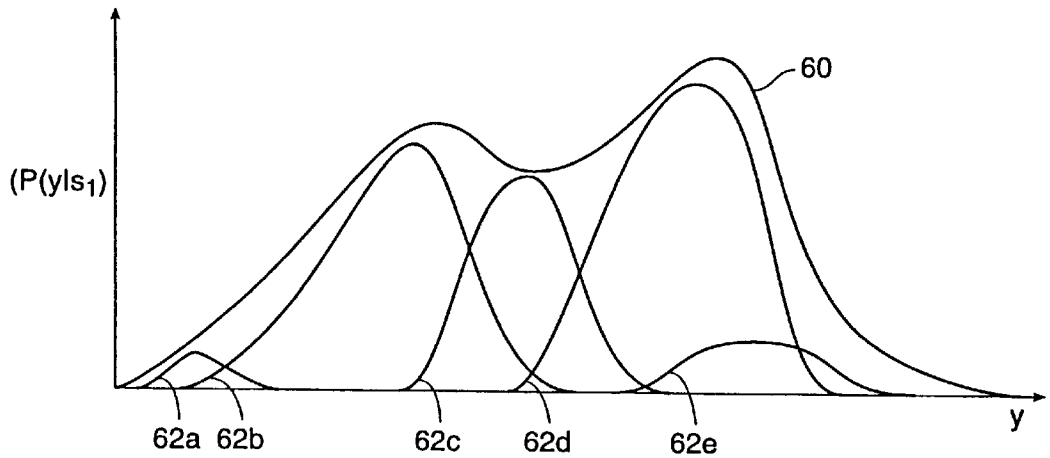
FIG. 3 is a diagram illustrating a method for fitting a mixture of Gaussian curves to the observed feature data of one state of a phone.

As part of the task of selecting a model for a speech recognition system, the system designer determines the form of the probability equations $P(y|s_1)$, $P(y|s_2)$, $P(y|s_3)$. One form for these equations that has been effectively utilized is to represent the equations as a sum of weighted Gaussian curves. Such a sum is represented in FIG. 3. Curve 60 represents $P(y|s_1)$ as determined from the observed training feature data. The speech recognition system designer wishes to develop a probability function for $P(y|s_1)$. This probability function must "fit" the observed data 60. It has been found in existing speech recognition systems that the training data may be represented by a sum of weighted Gaussian probability functions, shown as curves 62a–e. (These curves 62a–e are a one-dimensional representation of the actual multi-dimensional Gaussian functions.) This weighted Gaussian sum is referred to in the art as a "Gaussian mixture." If each Gaussian curve, 62a–e, is represented by a weighted Gaussian function $\lambda_i G_i(y)$, then the probability $P(y|s_1)$ may be represented by the function:

$$P(y_t|s_t) = \sum_{i=1}^{N_\omega} \lambda_i G_i(y_t) \quad (1)$$

where s represents the HMM state, y the observed features at a given frame t, $G_i(y)$ a series of Gaussian curves, and $\lambda_i$ a series of weighting constants. If the speech recognition system designer selects a model using a probability function in form of equation (1), the task of training the model is to determine a set of Gaussian curves $G_i$ and weighting factors $\lambda_i$ that best fit the observed training data for each HMM state. Once the Gaussian curves and weighting factors are determined, they are stored by the system for use in recognition. A speech recognition system according to the present invention adapts the stored Gaussian curves G, and in one embodiment, the weighting constants $\lambda$, to a particular speaker in order to improve recognition performance of that speaker.

One characteristic that distinguishes prior art recognizers is the extent to which the stored Gaussian curves 62a–e are shared between different HMM states. In a fully continuous HMM system using Gaussian mixtures, there is no sharing. A different set of Gaussian curves $G_{si}$ is estimated and stored for each different HMM state. Other systems have some degree of mixture tying. In such a system, the same set of Gaussian curves is used for more than one HMM state and only the weighting coefficients, $\lambda_i$, are modified for HMM states that are tied. The term "codebook" is used generally in the art to denote the set $G_{Ci}$ of Gaussian curves used to approximate the HMM states in a tied-mixture system.

Figure 4:
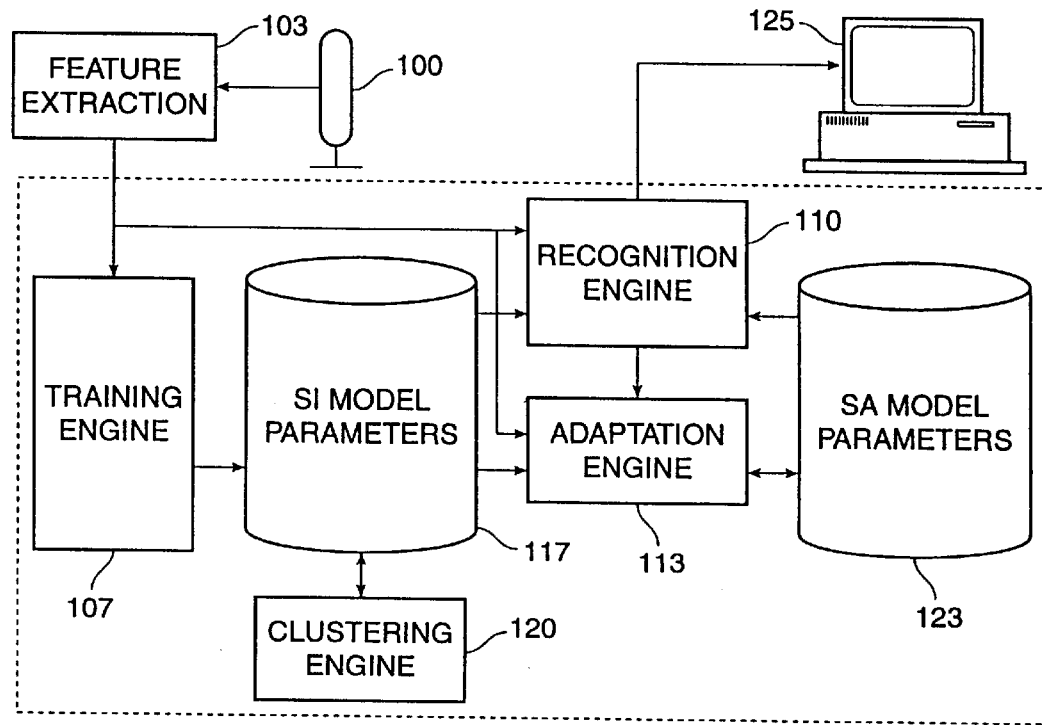
FIG. 4 is a block diagram of a speech recognition system built according to one embodiment of the invention.

FIG. 4 is a block diagram of a speech recognition system built according to the invention. The system consists of a microphone 100, a feature extraction module 103, a training engine 107, a recognition engine 110, an adaptation engine 113, a set of stored SI models 117, a clustering engine 120, a set of stored SA models 123, and an output device 125.

Operation of the system occurs as follows. Microphone 100 receives speech signals. Extractor 103 decodes the signals into data that can be manipulated by the rest of the system. Initially, the speech signals are training data consisting of transcribed sentences spoken by a group of speakers. Training engine 107 uses these transcribed sentences to determine initial parameters for untied codebooks for the speech states in the system and stores those parameters in 117.

Clustering engine 120 operates on the trained models 117 to create a set of tied models according to a method disclosed in above referenced related patent application. Clustering engine 120 identifies states sharing similar Gaussians, groups those states into clusters, splits the clusters, and then creates an individual "codebook" or "genone" for each cluster. The codebooks contain a set of Gaussians used to estimate the states in that cluster. After operation of clustering engine 120, the probability function stored in 117 for a state s may be written as $$P(y_t|s_t) = \sum_{i=1}^{N_\omega} \lambda_i G_{ci}(y_t) \quad (2)$$

where $G_{Ci}$ is a Gaussian in the codebook for cluster C. Gaussian codebooks created by clustering engine 117 with an arbitrary degree of mixture tying may be referred to as "genones" and HMM systems with an arbitrary degree of genone sharing are referred to as genonic HMMs.

Figure 1A:
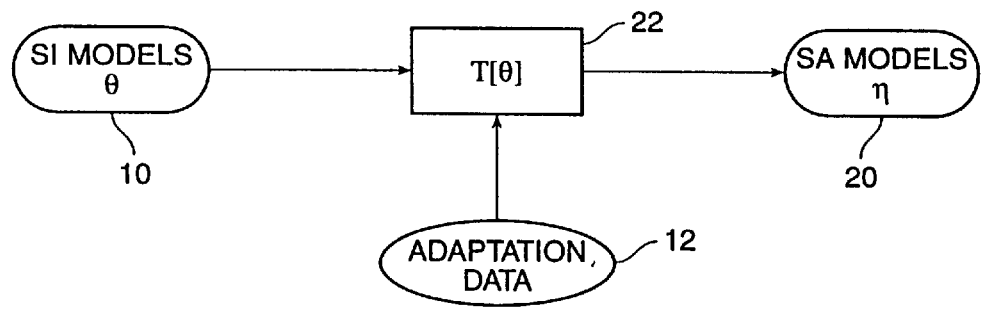
FIGS. 1A–C are diagrams illustrating adaptation using model transformation according to the invention, adaptation using Bayesian techniques, and adaptation using combined model transformation and Bayesian techniques according to the invention.
Figure 1B:
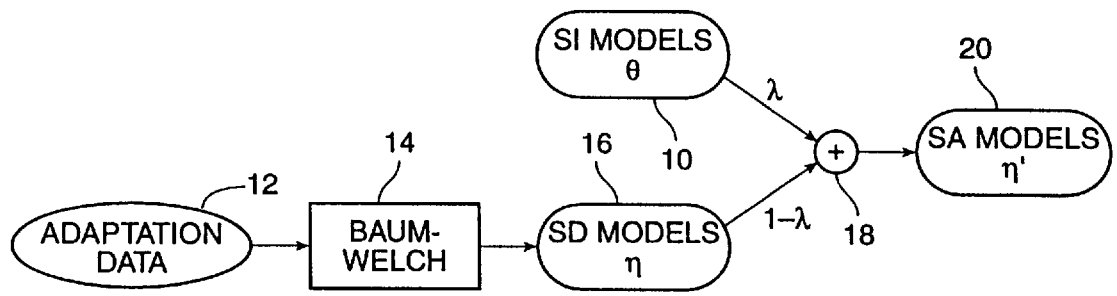

Once clustering engine 117 has converted the SI models to genonic SI HMMs, the models may be used by recognition engine 110 to recognize untranscribed speech as follows. Untranscribed speech is received by microphone 100 and its features are extracted by 103. Extractor 103 supplies feature data set x to recognition engine 110. Recognition engine 110 uses the models stored in 117 having the form of (2) to determine a most probable path of speech states for data x. This most probable state path is associated with particular words as depicted in FIG. 1. Recognizer 110 may display the recognized words on output device 125.

Once the recognition system contains a fully trained set of SI models of the form of equation (2), recognition engine 110 is ready to recognize untranscribed speech. However, a new speaker using the system may have an accent or speech pattern that is very different from the training data used to train the models. In such a case, while a majority of words and states may be recognized by recognition engine 110 using SI HMMs 117, the recognition error rate will be high. Adaptation engine 113 may be used according to the present invention to improve the performance of recognition engine 110 as follows. Signals from a new speaker speaking into microphone 100 are processed by extractor 103 and the feature data set y is supplied to recognition engine 110 and to adaptation engine 113. Recognition engine 110 then determines recognized states from the feature data, and makes those states known to adaptation engine 113. Adaptation engine 113 then compares the stored SI data for the recognized states with the actual data from the new speaker and determines a set of transformations for the probability models for those states so that the probability models better fit the actual data from the new speaker. After receiving a limited number amount data from the new speaker, adaptation engine 113 then applies the transformations to all the states in the SI HMMS to generate a set of SA HMMs 123. Once SA HMMs 123 are generated, those HMMs are used by recognition engine 110 to identify states in the incoming speech signal. According to one embodiment, adaptation engine 113 may continue to improve the SA HMMs throughout the time that the new speaker is speaking such that the SA HMMs gradually approach the form of models developed for that particular speaker.

The transformation employed by adaptation engine 113 of the present invention may be more easily explained if the probability density function of equation (2) is rewritten as a speaker-independent HMM for the SI vector process $[y_t]$ with observation densities of the form:

$$p_{SI}(y_t|s) = \sum_i \rho(\omega_i|s_t) N(y_t; \mu_{ig}, \Sigma_{ig}) \quad (3)$$

where $P(w_i|s_t)$ is a coefficient matrix corresponding to $\lambda_i$, and $N(y_t;\mu_i; \Sigma_i)$ is a Gaussian function with a mean $\mu_i$ and a covariance $\Sigma_i$, $N_w$ is an integer equal to the number of Gaussians in the particular codebook, and g is the Gaussian codebook (or genone) index.

Adaptation of this system is achieved according to one embodiment of the invention by jointly transforming all the Gaussians of each genone. Specifically, the invention assumes that, given the genone index of the HMM state $s_t$, the speaker-dependent vector process $[x_t]$ can be obtained by the underlying independent vector process $[y_t]$ through the transformation $x_t = A_g y_t + b_g$. This model is equivalent to assuming that the random vector x is obtained through an affine transformation x=Ay+b from the unobserved vector y that has a known mixture density $$g(y) = \sum_{i=1}^{N_\omega} P(\omega_i) N(y; \mu_i, \Sigma_i). \quad (4)$$

Maximum Likelihood (ML) estimation of the constrained Gaussian-mixture model is equivalent to estimating the regression parameters A, b using only observations of the dependent variable x and the knowledge of the distribution of the unobserved variable y.

Applying the transformation, the SA observation densities according to the invention have the form $$p_{SA}(x_t|s) = \sum_i \rho(\omega_i|s) N(x_i; A_g \mu_{ig} + b_g, A_g \Sigma_{ig} A_g^T) \quad (5)$$

and only the transformation parameters $A_g$, $b_g$, g=1, ..., $N_g$ need to be estimated by engine 113 during adaptation, where $N_g$ is the number of distinct transformations. The same transformations can be applied to different HMM states, and this tying of transformations can be used to optimize performance based on the amount of available adaptation data.

Adaptation engine 113 estimates the transformation parameters $A_g$, $b_g$, g=1, ..., $N_g$ according to an extension of the known Expectation Maximization (EM) method for the constrained estimation of Gaussian mixtures. The training procedure according to the invention using the Baum-Welch algorithm is as summarized below:

1. Initialize all transformations with $A_g(O)=1$, $b_g(O)=0$, g=1, ..., N. Set k=0.

2. E-step: Perform one iteration of the forward-backward algorithm on the speech data, using Gaussians transformed with the current value of the transformations $A_g(k)$, $b_g(k)$. For all component gaussians and all genones g collect the sufficient statistics:

$$\bar{\mu}_{ig} = \frac{1}{n_{ig}} \sum_{t,s_t} \gamma_t(s_t) \phi_{it}(s_t) x_t \quad (7)$$

$$\bar{\Sigma}_{ig} = \frac{1}{n_{ig}} \sum_{t,s_t} \gamma_t(s_t) \phi_{it}(s_t)(x_t - \bar{\mu}_{ig})(x_t - \bar{\mu}_{ig})^T \quad (8)$$

$$n_{ig} = \sum_{t,s_t} \gamma_t(s_t) \phi_{it}(s_t) \quad (9)$$

where $\gamma_t(s_t)$ is the probability of being at state $s_t$ at time t given the current HMM parameters $\lambda_k$, the summation is over all times and HMM states that share the same mixture components, and $\phi_{it}(s_t)$ is the posterior probability $$\phi_{it}(s_t) = \rho(\omega_{ig}|A_g(k), b_g(k), x_t, s_t) \quad (10)$$

3. M-step: Compute the new transformation parameters. Under the assumption of diagonal covariance and transformation matrices, the elements a and b of $A_g(k+1)$, $b_g(k+1)$ can be obtained by solving the following equations for each g
where the offset b is given by $$\left(\sum_{i=1}^{N_\omega} n_i\right) a^2 - \left(\sum_{i=1}^{N_\omega} \frac{n_i}{\sigma_i^2}\right) b^2 - \left(\sum_{i=1}^{N_\omega} \frac{n_i m_i}{\sigma_i^2}\right) ab + \quad (11)$$

$$\left(\sum_{i=1}^{N_\omega} \frac{n_i \bar{\mu}_i \mu_i}{\sigma_i^2}\right) a + \left(2 \sum_{i=1}^{N_\omega} \frac{n_i \bar{\mu}_i}{\sigma_i^2}\right) b - \left(\sum_{i=1}^{N_\omega} n_i \frac{\bar{\mu}_i^2 + \bar{\sigma}_i^2}{\sigma_i^2}\right) = 0$$

$$b = \left(\sum_{i=1}^{N_\omega} \frac{n_i \bar{\mu}_i}{\sigma_i^2} - a \sum_{i=1}^{N_\omega} \frac{n_i \mu_i}{\sigma_i^2}\right) / \left(\sum_{i=1}^{N_\omega} \frac{n_i}{\sigma_i^2}\right) \quad (12)$$

where for simplicity we have dropped the dependence on g. The variables $\mu_i$, $\sigma_i^2$, $\bar{\mu}_i$, $\bar{\sigma}_i^2$ are the elements of the vectors and diagonal matrices $\mu_{ig}$, $\Sigma_{ig}$, $\bar{\mu}_{ig}$, $\bar{\Sigma}_{ig}$, respectively.

4. If the convergence criterion is not met, go to step 2.

Because the Gaussian adaptation transformation employed by the invention is an instance of the Baum-Welch algorithm for HMMs with constrained mixture densities, it can be implemented efficiently. Specifically, the sufficient statistics are the same as in the case of unconstrained mixture densities. Hence, the E-step at each iteration of the adaptation algorithm requires the computation and storage of these statistics and is equivalent to the E-step of the Baum-Welch algorithm for unconstrained mixture densities. The computational requirements of the M-step are very small compared to the E-step.

According to the invention, the above transformation can also be modified to monotonically approach speaker-dependent (SD) training as the amount of adaptation speech is increased by setting a threshold and re-estimating without constraints all individual Gaussians for which the number of samples assigned to them is larger than the threshold. Hence, all Gaussians with a sufficiently large amount of adaptation speech are re-estimated independently, whereas Gaussians with little or no adaptation data are adapted in groups. In addition, if the total amount of adaptation data for a particular genone is less than a prespecified threshold, then an identity transformation is used for all of its Gaussians. Once the transformation parameters are determined, the constrained ML estimates for the means and covariances can be obtained using $$\mu_{ig}^{CML} = A_g \mu_{ig} + b_g$$

$$\Sigma_{ig}^{CML} = A_g \Sigma_{ig} A_g^T \tag{13}$$

COMBINING TRANSFORMATION AND BAYESIAN-BASED ADAPTATION

Figure 5:
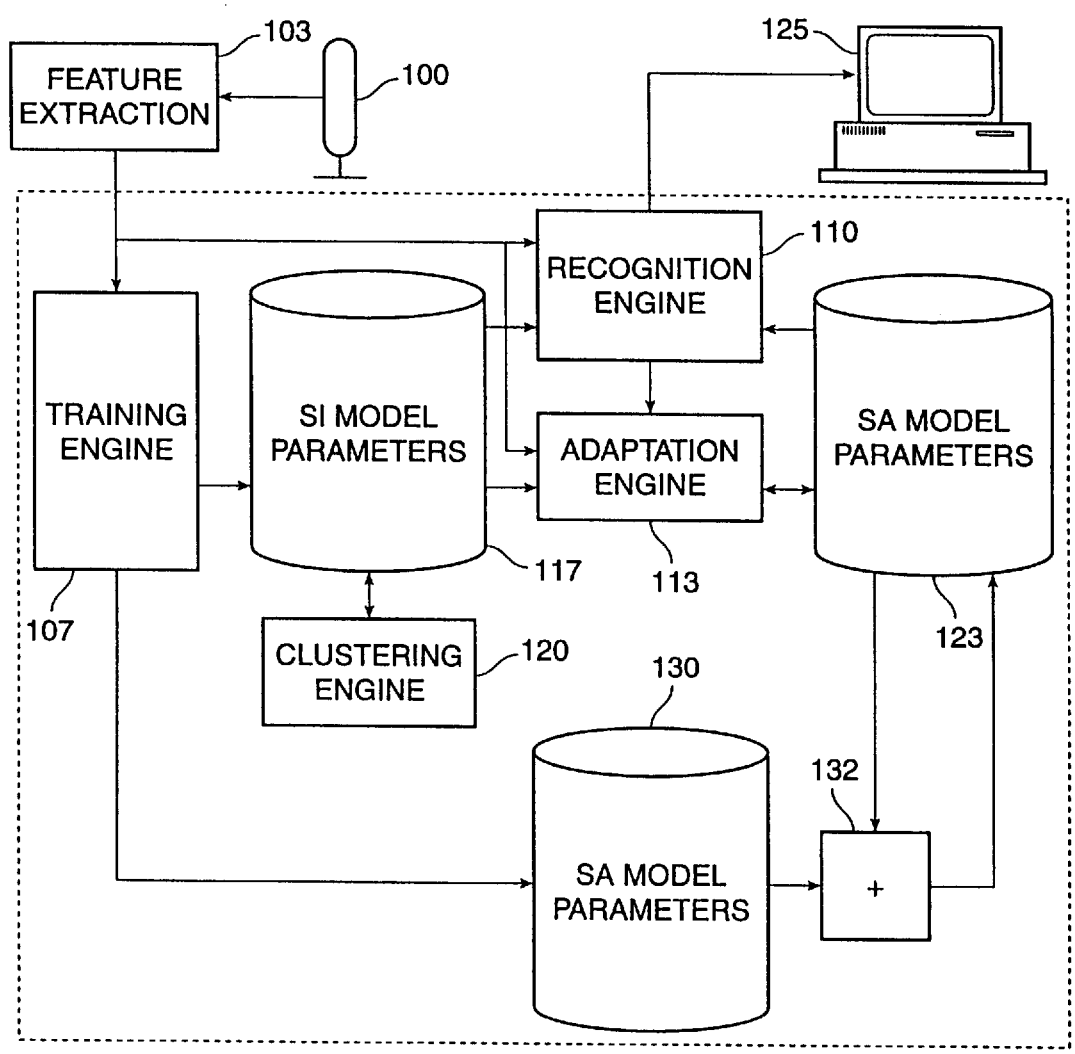
FIG. 5 is a block diagram of a speech recognition system built according to a further embodiment of the invention.

According to a further embodiment of the invention, illustrated in FIG. 5, the transformation-based speaker adaptation technique is effectively combined with a known Bayesian adaptation technique to achieve superior recognition performance. In Bayesian adaptation techniques, the limited amount of adaptation data is optimally combined with the prior knowledge derived from the speaker independent training data. With the appropriate choice of the prior distributions, the maximum a posteriori (MAP) estimates for the means and covariances of HMMs with single-Gaussian observation densities can be obtained using linear combinations of the speaker-dependent counts and some quantities that depend on the parameters of the prior distributions (See Lee 1991). The term counts denotes the sufficient statistics collected by performing one iteration of the forward-backward algorithm on the adaptation data. MAP estimates for the parameters of continuous mixture-density HMMs can also be obtained in the same way, (See Lee 1993). For example, the MAP estimate for the mean $\mu$ of the ith Gaussian in the HMM mixture density of state s can be obtained using $$\mu_{ig}^{MAP} = \frac{\tau_{ig} m_{ig} + \sum_{t,s} \gamma_t(s)\phi_{it}(s)x_t}{\tau_{ig} + \sum_{t,s} \gamma_t(s)\phi_{it}(s)} \tag{14}$$

where $\gamma_t(s)$ is the probability of being at state s at time t given the current HMM parameters, and $\phi_{it}(s)$ is the posterior probability of the ith mixture component $$\phi_{it}(s) = p(\omega_{ig}|x_t, s) = \frac{p(\omega_{ig}|s)N(x_t; \mu_{ig}, \Sigma_{ig})}{\sum_j p(\omega_{jg}|s)N(x_t; \mu_{jg}, \Sigma_{jg})} \tag{15}$$

The quantities $\tau_i(s)$, $m_i(s)$ are parameters of the joint prior density of the mixture parameters, which was chosen as a product of the Dirichlet and normal-Wishart densities. The parameter $\tau_i(s)$ is usually estimated empirically and can be used to control the adaptation rate. Similar estimation formulae can be used for the covariances $\sigma$ of the Gaussians. Based on the similar formulae for the second order statistics, an approximate MAP (AMAP) can be implemented by linearly combining the speaker independent and the speaker-dependent counts for each component density $$<x>_{ig}^{AMAP} = \lambda <x>_{ig}^{SI} + (1-\lambda)<x>_{ig}^{SA} \tag{16}$$

$$<xx^T>_{ig}^{AMAP} = \lambda <xx^T>_{ig}^{SI} + (1-\lambda)<xx^T>_{ig}^{SD} \tag{17}$$

$$n_{ig}^{AMAP} = \lambda n_{ig}^{SI} + (1-\lambda)n_{ig}^{SD} \tag{18}$$

where the superscripts on the right hand side denote the data over which the following statistics (counts) are collected during one iteration of the forward-backward algorithm $$<x>_{is} = \sum_t \gamma_t(s)\phi_{it}(s)x_t \tag{19}$$

$$<xx^T>_{is} = \sum_t \gamma_t(s)\phi_{it}(s)x_t x_t^T \tag{20}$$

$$n_{is} = \sum_t \gamma_t(s)\phi_{it}(s) \tag{21}$$

The means and covariances of each Gaussian component density can then be estimated using the combined counts. The weight $\lambda$ controls the adaptation rate. This method may be referred to as approximate Bayesian adaptation. Similar adaptation schemes have also appeared for discrete HMMs (See Huang 1993), and can be used to adapt the mixture weights in the approximate Bayesian scheme described here.

The weight $\lambda$ controls the adaptation rate. Using the combined counts, we can compute the AMAP estimates of the means and covariances of each Gaussian component density from $$\mu_{ig}^{AMAP} = \frac{<x>_{ig}^{AMAP}}{n_{ig}^{AMAP}} \tag{22}$$

$$\Sigma_{ig}^{AMAP} = \frac{<xx^T>_{ig}^{AMAP}}{n_{ig}^{AMAP}} - \mu_{ig}^{AMAP}(\mu_{ig}^{AMAP})^T$$

Similar adaptation schemes have also appeared for discrete HMMs [11], and can be used to adapt the mixture weights in the approximate Bayesian scheme described here.

In Bayesian adaptation schemes, only the Gaussians of the speaker-independent models that are most likely to have generated some of the adaptation data will be adapted to the speaker. These Gaussians may represent only a small fraction of the total number in continuous HMMs with a large number of Gaussians. On the other hand, as the amount of adaptation data increases, the speaker-dependent statistics will dominate the speaker-independent priors and Bayesian techniques will approach speaker-dependent performance. We should, therefore, aim for an adaptation scheme that retains the nice properties of Bayesian schemes for large amounts of adaptation data, and has improved performance for small amounts of adaptation data. We can achieve this by using our transformation-based adaptation as a preprocessing step to transform the speaker-independent models so that they better match the new speaker characteristics and improve the prior information in MAP estimation schemes.

To combine the transformation and the approximate Bayesian methods, the invention first transforms the speaker-independent counts using the transformation parameters estimated with the constrained ML (CML) method described above.

$$<x>_{ig}^{CML} = A_g <x>_{ig}^{SI} + b_g \quad (23)$$

$$<xx^T>_{ig}^{CML} = A_g <xx^T>_{ig}^{SI} A_g^T + A_g <x>_{ig}^{SI} b_g^T + b_g <x^T>_{ig}^{SI} A_g^T + n_{ig}^{SI} b_g b_g^T \quad (24)$$

The transformed counts can then be combined with the speaker-dependent counts collected using the adaptation data $$<x>_{ig}^{COM} = \lambda <x>_{ig}^{CML} + 1 - \lambda <x>_{ig}^{SD} <xx^T>_{ig}^{COM} = \lambda <xx^T>_{ig}^{CML} + (1-\lambda)<xx^T>_{ig}^{SD}, n_{ig}^{COM} = \lambda n_{ig}^{CML} + (1-\lambda) n_{ig}^{SD} \quad (25)$$

and the combined-method models can be estimated from these counts using $$\mu_{ig}^{COM} = \frac{<x>_{ig}^{COM}}{n_{ig}^{COM}} \quad (26)$$

$$\Sigma_{ig}^{COM} = \frac{<xx^T>_{ig}^{COM}}{n_{ig}^{COM}} - \mu_{ig}^{COM}(\mu_{ig}^{COM})^T$$

Figure 1C:
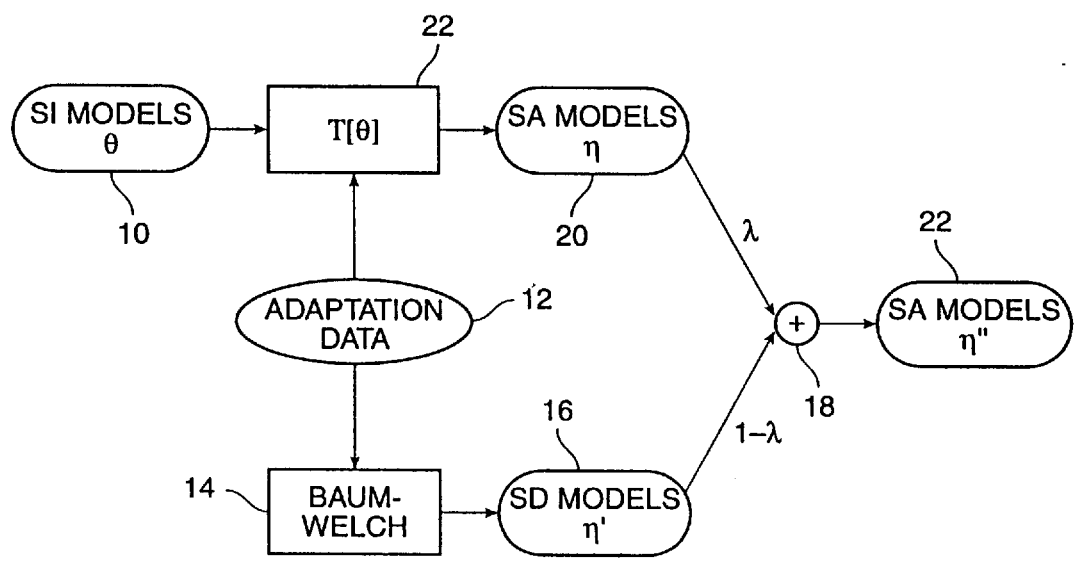

This procedure is shown schematically in FIG. 1c. A block diagram of a speech recognition system employing this procedure is shown in FIG. 5. In addition to the components in FIG. 4, this recognition system includes a set of speaker dependent models 130 and a combining engine 132 for combining the SD models 132 with the SA models 123 to improve the recognition performance of models 123.

EXPERIMENTAL RESULTS OF THE CML METHOD

We evaluated our adaptation algorithms on the large-vocabulary Wall Street Journal corpus. Experiments were carried out using SRI's DECIPHER™ speech recognition system configured with a six-feature front end that outputs 12 cepstral coefficients ($c_1$–$c_{12}$), cepstral energy ($c_0$), and their first-order and second-order differences. The cepstral features are computed from an FFT filterbank, and subsequent cepstral-mean normalization on a sentence basis is performed. We used genonic hidden Markov models with an arbitrary degree of Gaussian sharing across different HMM states. For fast experimentation, we used the progressive search framework: an initial, speaker-independent recognizer with a bigram language model outputs word lattices for all the utterances in the test set. These word lattices are then rescored using speaker-dependent or speaker-adapted models. We performed two series of experiments, on native and non-native speakers of American English, respectively. All experiments were performed on the 5,000-word closed-vocabulary task, and are described below.

To compare SI, SD and SA recognition performance on native speakers, we performed an initial study of our adaptation algorithms on the phase-0 WSJ corpus. We used phonetically tied mixture HMM systems, with all allophones of the same context-independent phone sharing the same mixture components, that is, we used systems with one genone per phone. Speaker-independent systems were trained on 3,500 sentences from 42 male speakers. The different cepstral features were modeled as independent observation streams, and each codebook used 50 Gaussians for the vector features and 15 Gaussians for the scalar (energy) features. There was a total of 6,300 phonetic models, each with three states. The number of distinct output distributions was clustered down to 6,300 (a 3-fold reduction) using state-based clustering since a more compact system with fewer parameters is better suited for adaptation. The performance of the adaptation algorithm was evaluated on 100 sentences from each of six male speakers (001, 00b, 00c, 00d, 400, and 431) for varying amounts of training/ adaptation sentences. The SI word error rate for these speakers was 15.51%, including deletions and insertions. We also evaluated the SD performance by separately training a speaker-dependent system for each one of the six speakers using 600 utterances, and found that the SD error rate was 11.51%. We then tested the adaptation algorithm using a small amount of adaptation data (40 utterances), and the word error rate after adaptation was 13.60%. Thus, with 40 adaptation sentences, 60% of the gap between SI and SD performance was overcome.

We then evaluated the SA system performance for varying amounts of adaptation data, using three of the speakers. The results are summarized in FIG. 6. With 100 adaptation sentences, the adaptation scheme achieves the performance of a speaker-dependent system that used 6 times as much training data. When all the SD training data are used as adaptation data, the SA system achieves a 50% reduction in error rate over the SI system and a 25% reduction over the SD system.

Speaker adaptation becomes a very important technology for non-native speakers, since the SI error rate is too high for any practical application. In testing the adaptation algorithm on the "spoke 3" task of the phase-1 Wall Street Journal corpus, we focused on improving recognition performance for non-native speakers of American English using adaptation. Since the phase-1 corpus was available during this series of experiments, the SI systems were built using 17,000 training utterances from 140 male speakers. To reduce computing requirements we tuned the algorithm using the five male speakers in the phase-1 WSJ development data set. The evaluation data set was run only once at the end of the development phase. The data set includes 40 test sentences and 40 phonetically balanced adaptation sentences per speaker. The speakers were selected according to their fluency in English, covering strong to light accents.

Figures 6, 7:
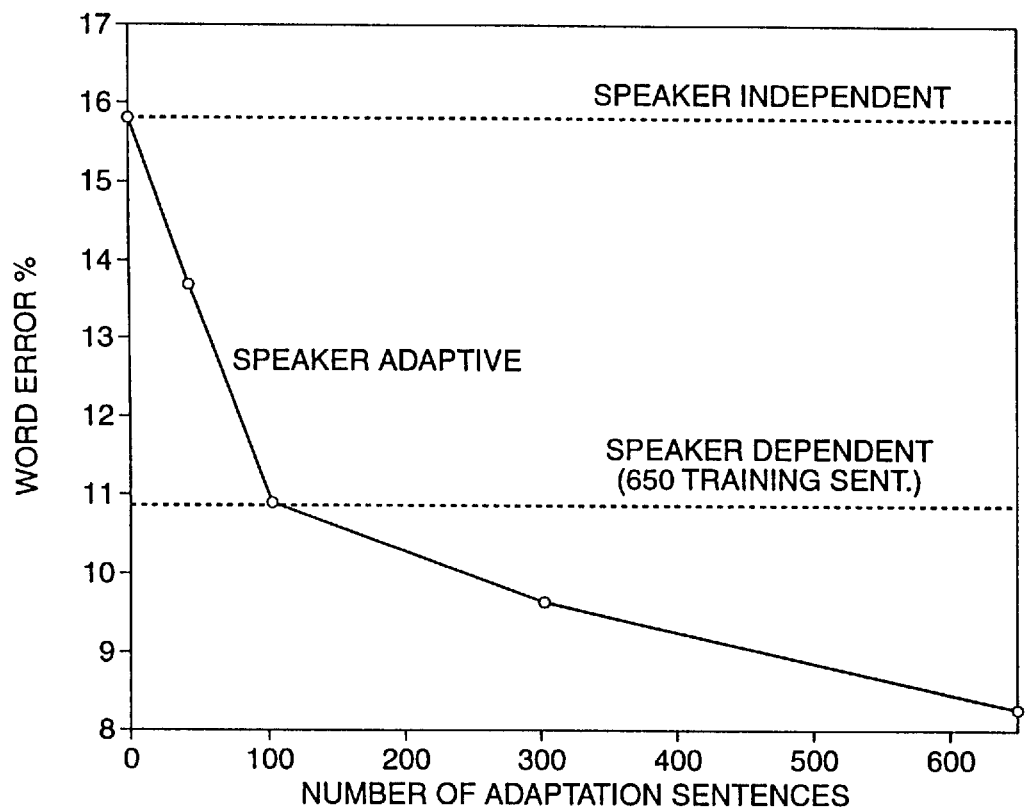
FIG. 6 is a graph showing SI, SA, and SD word error rates for native speakers.
FIG. 7 is a table showing SI and SA word error rates for non-native speakers for various degrees of mixture tying and various numbers of transformations.

We first tested four different systems to determine the optimal degree of Gaussian sharing for this task. All of the systems used 11,932 context-dependent phonetic models, each with three states. Context dependency was modeled only within words, since we have found in preliminary experiments that modeling coarticulation across word boundaries does not improve recognition performance for non-native speakers. The numbers of genones used in these systems were 40 (1 genone per phone), 200, 500, and 950. Each genone consisted of a mixture of 32 Gaussian distributions. The SI and SA performance is shown in FIG. 7. The adaptation was applied sequentially to the Gaussian distributions and the mixture weights.

In genonic HMMs, an arbitrary degree of mixture tying across different HMM states can be selected through an agglomerative clustering procedure. If the degree of tying is small, and consequently the number of genones is large (as in the 500-and 950-genone systems in FIG. 7), then a large number of linear transformations may have to be estimated during adaptation. We can overcome this problem by using tying of the transformations across different genones, and the agglomerative clustering scheme used for the genone construction is very suitable for this. Each node in the tree that is generated during the clustering procedure corresponds to a set of states, with the leaves of the tree corresponding to single HMM states. The degree of tying used in a particular system can be represented by a cut through the tree. The location of the cut is determined by the stopping criterion of the agglomerative clustering. Thus, if we want to use a smaller number of transformations than the number of genones in the system, we can somewhat relax the stopping criterion (i.e., cluster more aggressively) and determine a second cut, at a higher level through the tree. All nodes of the original cut (i.e., all genones) that fall under the same node of the new cut can share the same transformation. The third column in FIG. 7 indicates the number of linear transformations used in re-estimating the Gaussian distributions. In the first two systems we used one transformation per genone. In the remaining two systems with large numbers of genones, we grouped the transformations in order to reduce the number of parameters to be estimated.

The SI word error rates for the various systems were similar, ranging from 28.7% to 30.1%. By using tying of the transformations during adaptation for the 950- and 500- genone systems and reducing the number of transformations from 950 and 500 to 200, the SA error rates were reduced from 17.7% and 16.6% to 15.8% and 15.1%, respectively. The SA error rate of 15.1% was the lowest overall for all the systems that we examined, and the average improvement due to the adaptation algorithm for the five speakers was 47%. To evaluate the relative contribution of the two stages of our adaptation scheme, we evaluated the SA error rate for our best system with the mixture-weight adaptation disabled. We found that by adapting the Gaussian codebooks only using the constrained estimation method, the SA word error rate was 15.6%. Hence, for continuous HMMs most of the performance gain during adaptation is achieved by adapting the Gaussian codebooks.

EXPERIMENTAL RESULTS OF THE COMBINED METHOD

We also evaluated the combined method on the "spoke 3" task of the phase-1, large-vocabulary Wall Street Journal corpus, trying to improve recognition performance for non-native speakers of American English. The speaker-independent continuous HMM systems that we used as seed models for adaptation were gender dependent, trained on 140 speakers and 17,000 sentences for each gender. Each of the two systems had 12,000 context-dependent phonetic models which shared 500 Gaussian codebooks with 32 Gaussian components per codebook. For fast experimentation, we used the progressive search framework: an initial, speaker-independent recognizer with a bigram language model outputs word lattices for all the utterances in the test set. These word lattices are then rescored using speaker-adapted models. We used the baseline 5,000-word, closed-vocabulary bigram and trigram language models provided by Lincoln Laboratory. The trigram language model was implemented using the N-best rescoring paradigm, by rescoring the list of the N-best sentence hypotheses generated using the bigram language model.

In the first series of experiments we used the bigram language model. We first evaluated the performance of the transformation-based adaptation for various numbers of transformations and amounts of adaptation data. As we can see in FIG. 8, where we have plotted the word error rate as a function of the number of adaptation sentences, multiple transformations outperform very constrained schemes that use 1 or 2 transformations. The performance with 20 and 40 transformations is similar, and is better than the less constrained case of 160 transformations. However, as the amount of adaptation data increases, the 160 transformations take advantage of the additional data and outperform the more constrained schemes. A significant decrease in error rate is obtained with as little as 5 adaptation sentences. When adapting using a single sentence, the performance is similar for different number of transformations, except for the case of two transformations. The reason is that in our implementation a transformation is re-estimated only if the number of observations is larger than a threshold, otherwise we use a global transformation estimated from all data. Since most of the transformations are backed off to the global transformation for the case of a single adaptation sentence, the schemes with different numbers of transformations exhibit similar performance.

Figure 8:
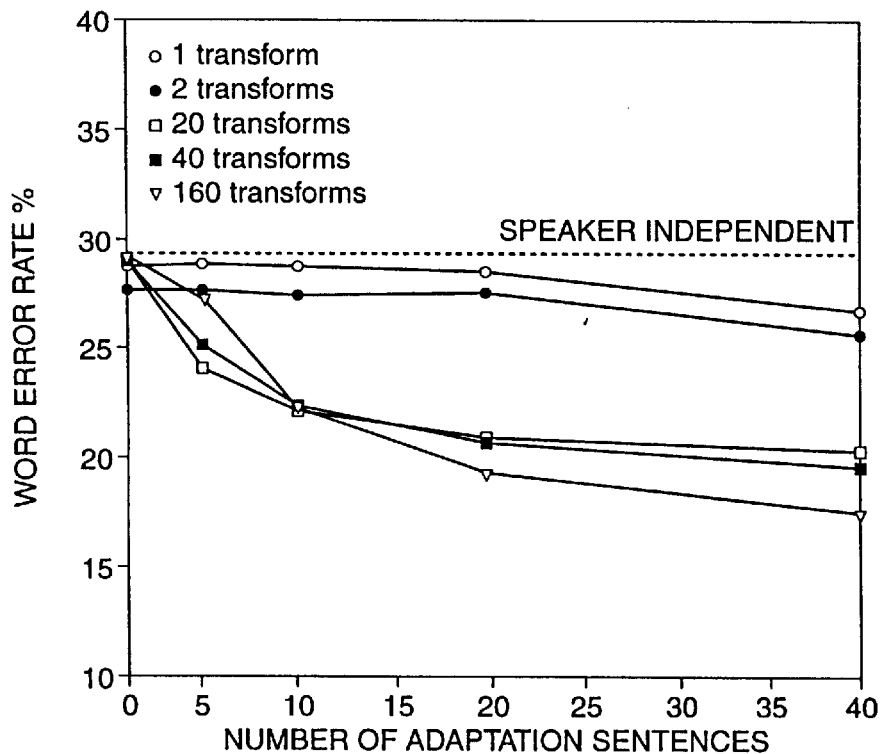
FIG. 8 is a graph showing word error rates for various numbers of transformations for transformation based adaptation.
Figure 9:
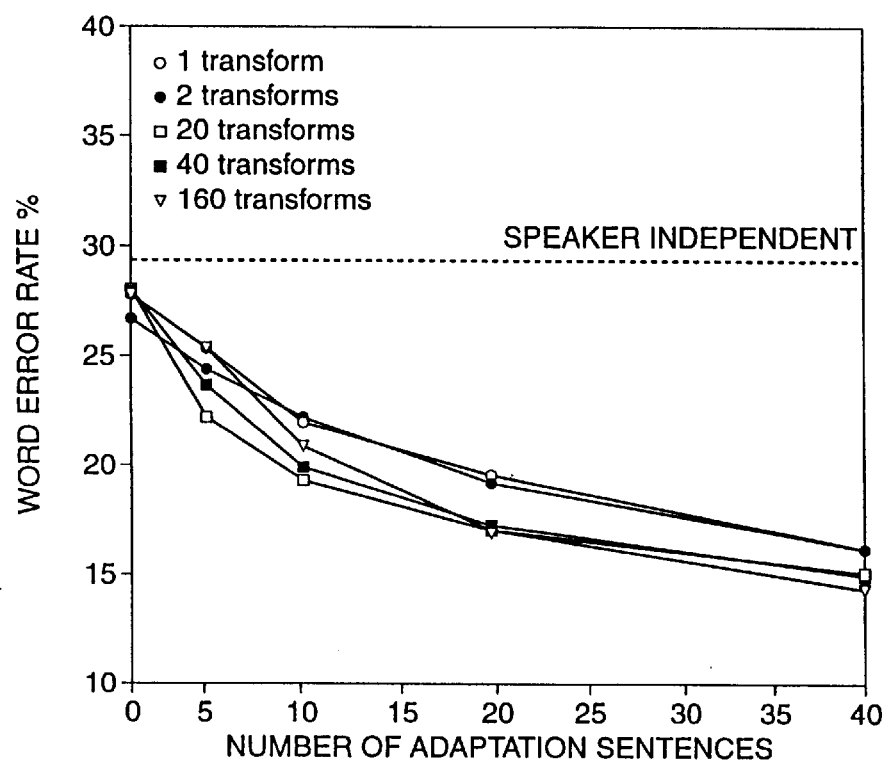
FIG. 9 is a graph showing word error rates for various numbers of transformations for combined adaptation.

In FIG. 9 we have plotted the word error rates of the combined scheme for the same numbers of transformations and adaptation sentences as in FIG. 8. The systems used to obtain the results of FIG. 8 are used as priors for the subsequent Bayesian estimation step, as explained in Section 3. We can see that the performance of the combined scheme becomes less sensitive to the number of transformations used, especially with larger numbers of adaptation sentences. This behavior should be expected, since Bayesian schemes will asymptotically converge to speaker dependent performance as the amount of adaptation data increases. However, when the number of adaptation sentences is small, it is important to select the appropriate number of transformations and provide the Bayesian step with good prior information.

Figures 10, 11:
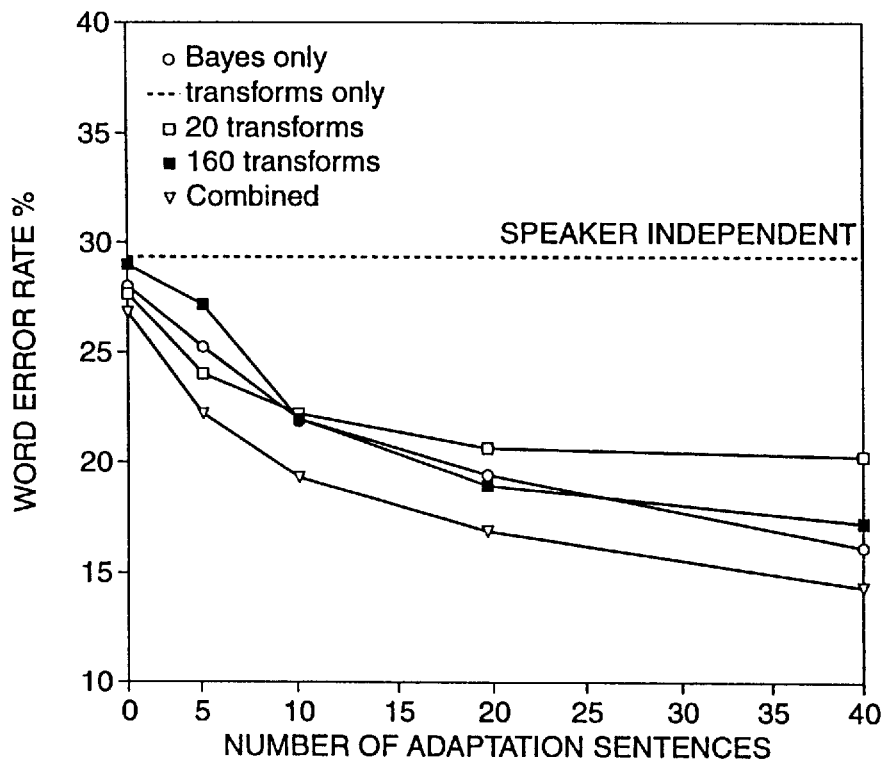
FIG. 10 is a graph comparing error rates for transformation-only, approximate Bayesian, and combined methods.
FIG. 11 is a table showing adaptation results using bigram and trigram language models.

In FIG. 10 we compare the word error rates of the transformation-only method with 20 and 160 transformations, the approximate Bayesian method with conventional priors, and the combined method for various amounts of adaptation data. In the latter, the number of transformations was optimized according to the available amount of adaptation data. The transformation-only method with 20 transformations outperforms the Bayesian scheme with conventional priors when less than 10 sentences are used for adaptation, whereas the situation reverses as more adaptation sentences are used. This is consistent with our claim that transformation-based methods adapt faster, whereas Bayesian schemes have better asymptotic properties. The performance of the transformation approach for large amounts of adaptation data can be improved by increasing the number of transformations. In the same figure, we can also see the success of the combined method, which outperforms significantly the first two methods over the whole range of adaptation sentences that we examined. The transformation step provides quick adaptation when few adaptation sentences are used, and the Bayesian re-estimation step improves the asymptotic performance.

Finally, we evaluated the word error rate of our best performing configuration for 40 adaptation sentences on the development and the previously unseen November 93 ARPA evaluation sets of the WSJ corpus using a trigram language model. Our results, presented in FIG. 11, represent the best reported results to date on this task. The non-native recognition performance after adaptation using only 40 sentences is slightly higher than that of native speakers, which for the same speaker independent models is 9.7% and 7.2% word error with a bigram and a trigram language model respectively. The first listed inventor, a non-native speaker of American English with a particularly heavy accent, was part of the development set. Since additional adaptation data were available for him, we evaluated the adaptation performance for up to 285 adaptation sentences (approximately 40 minutes of speech). For this particular speaker, the speaker-independent error rate decreases by a factor of 4 and 6 using 40 and 285 adaptation sentences, respectively. The speaker-adapted error rate of 7.1% is comparable to the state-of-the-art performance for native speakers on this task.

The invention has now been described with reference to specific embodiments. Other embodiments will be apparent to those of ordinary skill in the art. It is therefore not intended that this invention be limited, except as indicated in the appended claims.

What is claimed is:

1. A speaker adaptive speech recognition system comprising:

means for receiving a speech signal from a speaker;

feature extraction means for converting said speech signal into a data set of feature vectors;

means for storing a plurality of speaker independent models, said models initially having undetermined parameters;

a training engine for determining the parameters of said speaker independent models from a set of training data;

an adaptation engine capable of receiving speech data from a particular speaker and using said data from a particular speaker to determine the parameters of a plurality of transformations for transforming the parameters of said speaker independent models independently of a set of trained speaker dependent models said parameters once determined used to adapt a plurality of speaker independent models such that at least one speaker independent model may be adapted even where there is no speaker dependent data available for said at least one model using maximum likelihood techniques and generating a set of speaker adapted models; and a recognition engine capable of using said speaker independent models and said speaker adapted models to recognize words from a set of unidentified feature vectors.

2. The system according to claim 1 wherein the speaker independent and speaker adapted models are each associated with a subunit of speech and represent that subunit of speech as a plurality of states, each state having associated with it a probability function, the probability functions having parameters determined from training data, the probability function producing a probability that a given set of speech data is representative of that particular state.

3. The system according to claim 2 wherein the probability functions are stored in the system as a mixture of simple probability functions.

4. The system according to claim 3 wherein the adapting engine means adapts the system to a particular speaker by transforming the simple probability functions.

5. The system according to claim 3 wherein the simple probability functions are Gaussians.

6. The system according to claim 1 wherein said adaptation engine is capable of transforming said speaker independent models using nontranscribed speech data from said particular speaker.

7. A speaker adaptive speech recognition system comprising:

a set of models representing selected subunits of speech, each model having associated with it a plurality of states and each state having associated with it a probability function, the probability functions having parameters determined from training data said training data derived from a plurality of speakers from a training population;

means for collecting a set of speaker adaptation data from a particular speaker, said set of adaptation data comprising words of the speaker's choice spoken by the speaker, said adaptation data not necessarily comprising all the states in the speaker independent models;

means for determining an adaptation transformation using said speaker adaptation data and said models by evaluating how well adaptation features aligned to recognized states in said adaptation data are described by the corresponding states of said models and determining a transformation to improve the description by said models said adaptation transformation applicable to groups of models;

means for applying said transformation to said complete set of speaker independent models to create a complete set of speaker adapted models said transformation applicable to adapt a plurality of speaker independent models such that at least one speaker independent model may be adapted even where there is no speaker dependent data available for said at least one mode; and means for using said speaker adapted models to recognize subsequent speech data from said speaker.

8. The device according to claim 7 wherein the probability functions are represented by a mixture of simple probability functions and wherein said adapting means adapts the system to the speaker by transforming the simple probability functions.

9. The device according to claim 7 wherein the simple probability functions are Gaussians.

10. The device according to claim 7 wherein the speaker independent probability functions are Gaussians mixtures having the form $$p_{SI}(y_t|s) = \sum_i \rho(\omega_i|s_t) N(y_t; \mu_{ig}, \Sigma_{ig})$$

11. A speaker adaptive speech recognition system comprising:

a set of models representing selected subunits of speech, each model having associated with it a plurality of states and each state having associated with it a probability function, the probability functions having parameters determined from training data said training data derived from a plurality of speakers from a training population;

means for collecting a set of speaker adaptation data from a particular speaker, said set of adaptation data comprising words of the speaker's choice spoken by the speaker, said adaptation data not necessarily comprising all the states in the speaker independent models;

means for determining an adaptation transformation using said speaker adaptation data and said models by evaluating how well adaptation features aligned to recognized states in said adaptation data are described by the corresponding states of said models and determining a transformation to improve the description by said models;

means for applying said transformation to said complete set of speaker independent models to create a complete set of speaker adapted models; and means for using said speaker adapted models to recognize subsequent speech data from said speaker wherein the speaker independent probability functions are Gaussians mixtures having the form $$p_{SI}(y_t|s) = \sum_i \rho(\omega_i|s_t) N(y_t; \mu_{ig}, \Sigma_{ig})$$

and wherein the speaker adapted probability functions have the form $$p_{SA}(x_t|s) = \sum_i \rho(\omega_i|s) N(x_t; A_g \mu_{ig} + b_g, A_g \Sigma_{ig} A_g^T).$$

12. The device according to claim 11 wherein the transformation is accomplished according a method comprising the steps of:
  initializing all transformations with $A_g(0)=I$, $b_g(0)=0$, $g=1, \ldots, N$. Set $k=0$;
  E-step: performing one iteration of a forward-backward algorithm on the speech data, using Gaussians transformed with the current value of the transformations $A_g(k)$, $b_g(k)$;
  collecting for all component Gaussians and all genones g the sufficient statistics:

$$\bar{\mu}_{ig} = \frac{1}{n_{ig}} \sum_{t, s_t} \gamma_t(s_t) \phi_{it}(s_t) x_t$$

$$\bar{\Sigma}_{ig} = \frac{1}{n_{ig}} \sum_{t, s_t} \gamma_t(s_t) \phi_{it}(s_t) (x_t - \bar{\mu}_{ig})(x_t - \bar{\mu}_{ig})^T$$

$$n_{ig} = \sum_{t, s_t} \gamma_t(s_t) \phi_{it}(s_t)$$

where $\gamma_t(s_t)$ is the probability of being at state $s_t$ at time t given the current HMM parameters $\lambda_k$, the summation is over all times and HMM states that share the same mixture components, and $\phi_{it}(s_t)$ is the posterior probability $$\Phi_{it}(S_t) = \rho(\omega_{ig}|A_g(k), b_g(k), x_t, S_t);$$

M-step: computing the new transformation parameters obtained by solving the following equations for each g $$\left(\sum_{i=1}^{N_\omega} n_i\right) a^2 - \left(\sum_{i=1}^{N_\omega} \frac{n_i}{\sigma_i^2}\right) b^2 - \left(\sum_{i=1}^{N_\omega} \frac{n_i m_i}{\sigma_i^2}\right) ab +$$

$$\left(\sum_{i=1}^{N_\omega} \frac{n_i \bar{\mu}_i \mu_i}{\sigma_i^2}\right) a + \left(2 \sum_{i=1}^{N_\omega} \frac{n_i \bar{\mu}_i}{\sigma_i^2}\right) b - \left(\sum_{i=1}^{N_\omega} n_i \frac{\bar{\mu}_i^2 + \bar{\sigma}_i^2}{\sigma_i^2}\right) = 0$$

where the offset b is given by
  (where for simplicity we have dropped the dependence on g and where the variables $\mu_i, \sigma_i^2, \bar{\mu}_i, \bar{\sigma}_i^2$ are the elements of the vectors and diagonal matrices $$b = \left(\sum_{i=1}^{N_\omega} \frac{n_i \bar{\mu}_i}{\sigma_i^2} - a \sum_{i=1}^{N_\omega} \frac{n_i \mu_i}{\sigma_i^2}\right) \bigg/ \left(\sum_{i=1}^{N_\omega} \frac{n_i}{\sigma_i^2}\right)$$

$\mu_{ig}, \Sigma_{ig}, \bar{\mu}_{ig}, \bar{\Sigma}_{ig}$, respectively and
  if the convergence criterion is not met, going to E-step.

13. A speaker adaptive speech recognition system comprising:
  a set of models representing selected subunits of speech, each model having associated with it a plurality of states and each state having associated with it a probability function, the probability functions having parameters determined from training data;
  a plurality of codebooks, each codebook containing a set of simple probability functions; each codebook associated with a plurality of said states, the probability function of each one of said states being a weighted sum of the simple probability functions stored in its associated codebook;
  means for collecting a set of speaker adaptation data from a particular speaker, said set of speaker adaptation data comprising words of the speaker's choice spoken by the speaker;
  means for determining a transformation using said speaker adaptation data and said models, said transformation capable of transforming said models into a set of speaker adapted models;
  means for using said transformation on said set of models to create a set of speaker adapted models by applying a transformation derived from one state to the codebook associated with that state, thereby transforming the model for all other states associated with that codebook; and
  means for applying said speaker adapted models to subsequent speech data from said speaker.

14. The device according to claim 13 wherein the probability functions are represented by a mixture of simple probability functions and wherein said means for using adapts the system to the speaker by transforming the simple probability functions.

15. The device according to claim 13 wherein the simple probability functions are Gaussians.

16. The device according to claim 13 wherein the probability functions are Gaussians mixtures having the form $$p_{SI}(y_t|s) = \sum_i \rho(\omega_i|s_t) N(y_t; \mu_{ig}, \Sigma_{ig})$$

17. A speaker adaptive speech recognition system comprising:
  a set of models representing selected subunits of speech, each model having associated with it a plurality of states and each state having associated with it a probability function, the probability functions having parameters determined from training data;
  a plurality of codebooks, each codebook containing a set of simple probability functions; each codebook associated with a plurality of said states, the probability function of each one of said states being a weighted sum of the simple probability functions stored in its associated codebook;
  means for collecting a set of speaker adaptation data from a particular speaker, said set of speaker adaptation data comprising words of the speaker's choice spoken by the speaker;
  means for determining a transformation using said speaker adaptation data and said models, said transformation capable of transforming said models into a set of speaker adapted models;
  means for using said transformation on said set of models to create a set of speaker adapted models by applying a transformation derived from one state to the codebook associated with that state, thereby transforming the model for all other states associated with that codebook; and
  means for applying said speaker adapted models to subsequent speech data from said speaker wherein the speaker adapted probability functions have the form $$p_{SA}(x_t|s) = \sum_i \rho(\omega_i|s) N(x_t; A_g \mu_{ig} + b_g, A_g \Sigma_{ig} A_g^T).$$

18. In a speech recognition system for responding to signals representative of digital speech, a method for developing models adapted to an individual speaker comprising the steps of:

selecting a multi-state model with state probability functions, said state probability functions being of a general form with initially undetermined parameters;

creating an individual instance of a model for each subunit of speech to be processed;

using training data from a plurality of speakers to determine acoustic features of states of said models and to estimate probability density functions for said models;

clustering states based on their acoustic similarity;

creating a plurality of cluster codebooks, one codebook for each cluster; said cluster codebooks consisting of probability density functions that are shared by each cluster's states;

reestimating the probability densities of each cluster codebook and the parameters of the probability equations in each cluster;

acquiring a set of speaker dependent training data from an individual speaker, said set consisting of words spoken at random by said individual speaker;

recognizing said set of training data as being probably generated by particular states;

using the results of said recognizing to determine the parameters of a transformation associated with a particular codebook;

adapting the models in a particular codebook with a transformation having parameters estimated for that codebook to said particular speaker.

19. The method according to claim 18 wherein the simple probability functions are Gaussians.

20. The method according to claim 18 wherein the number of said clusters is an arbitrary number selected based on system resources and desired performance characteristics.

21. A speaker adaptive speech recognizer, comprising:

a computer;

storage means;

a set of models for subunits of speech stored in the storage means;

a feature extractor in the computer for extracting feature data capable of being processed by said computer from a speech signal;

training means in the computer for training the models using features from identified samples of speech data and for producing a master codebook of probability density functions for use by the models;

clustering means in the computer for identifying clusters of states that share subsets of the probability density functions in the codebooks;

splitting and pruning means in the computer for producing cluster codebooks by splitting the master codebook into subsets of probability densities shared by clustered states;

re-estimating means for retraining the models for the states in the clusters and for recalculating the probability densities in each cluster codebook;

recognizing means for matching features from unidentified speech data to the models to produce a most likely path through the models where the path defines the most likely subunits and words in the speech data; and speaker adaptive means for adapting each cluster codebook to an individual speaker using a small amount of speaker adaptive data from said individual speaker to determination a transformation for said codebooks and applying said transformation to the parameters of models in said cookbooks.

22. A speaker adaptive speech recognition system comprising:

means for receiving a speech signal from a speaker;

feature extraction means for converting said speech signal into a data set of feature vectors;

means for storing a plurality of speaker independent models said models initially having undetermined parameters;

training engine for determining the parameters of said speaker independent models from a set of training data;

an adaptation engine capable of receiving speech data from a particular speaker for transforming the parameters of said speaker independent models independently of a set of trained speaker dependent models using maximum likelihood techniques and generating a set of speaker adapted models; and a recognition engine capable of using said speaker independent models and said speaker adapted models to recognize words from a set of unidentified feature vectors further comprising:

means for storing a plurality of speaker dependent models trained by the training engine for an individual speaker;

means for combining parameters of said speaker adapted models with parameters of said speaker dependent models to generate improved speaker adapted models.

23. The system according to claim 22 wherein said improved speaker dependent models have parameters derived according to equations of the form $$\mu_{ig}^{COM} = \frac{<x>_{ig}^{COM}}{n_{ig}^{COM}}$$

$$\Sigma_{ig}^{COM} = \frac{<xx^T>_{ig}^{COM}}{n_{ig}^{COM}} - \mu_{ig}^{COM}(\mu_{ig}^{COM})^T$$

24. A method of adapting initial acoustic observation models to new acoustical conditions comprising:

selecting a transformation to be applied to the parameters of said models;

using condition specific data in order to determine parameters for said transformation; and applying the transformation using the transformation parameters to the parameters of the acoustic models in order to obtain adapted models, said transformation able to transform models for which no condition specific data is available.

25. The method according to claim 24 where said acoustic observation models are multi-state models with state probability functions, said state probability functions being of a general form with initially undetermined parameters.

26. The method according to claim 24 where said acoustic observation models are Hidden Markov Models (HMMs).

27. The method according to claim 24 wherein said acoustic observation models are speaker independent trained models and said condition specific data is a set of speaker adaptation data and the transformation is accomplished by applying individual transformations the means and the covariance of said acoustic observation models.

28. The method according to claim 27 wherein one of said individual transformations multiplies the means by a constant.

29. In a recognition system for responding to signals representative of observed physical data, and method for associating input data with a particular adapted model comprising:

deriving a set of adapted models $P_{sa}(X_t|s)$ from an original set of trained models $P_{sa}(w_t|s)$ by applying transformations $T_1$ to means $\mu$ and $T_2$ to the covariance $\Sigma$ having form $$p_{SA}(x_t|s) = \sum_i \rho(\omega_i|s) N(x_i: T_1(\mu_{ig}), T_2(\Sigma_{ig}));$$

and using said adapted models to recognize said signals representative of observed physical data.

30. The method according to claim 27 wherein one of said individual transformations multiplies the covariance by a constant.

* * * * *

UNITED STATES PATENT AND TRADEMARK OFFICE
CERTIFICATE OF CORRECTION

PATENT NO.    : 5,864,810
DATED         : January 26, 1999
INVENTOR(S)   : Vassilios Digalakis et al.

It is certified that error appears in the above-identified patent and that said Letters Patent is hereby corrected as shown below:

<u>Column 17,</u>
Lines 33 and 34, should read as follows:
-- M-step: computing the new transformation parameters $[A_g(k+1), b_g(k+1)]$ obtained by solving the following equations for each $g$ --

Signed and Sealed this

Twenty-eighth Day of June, 2005

JON W. DUDAS
*Director of the United States Patent and Trademark Office*